United States Patent

Saito et al.

[11] Patent Number: 5,887,127
[45] Date of Patent: Mar. 23, 1999

[54] SELF-HEALING NETWORK INITIATING FAULT RESTORATION ACTIVITIES FROM NODES AT SUCCESSIVELY DELAYED INSTANTS

[75] Inventors: Hiroyuki Saito; Makiko Yoshida, both of Tokyo, Japan

[73] Assignee: NEC Corporation, Japan

[21] Appl. No.: 751,387

[22] Filed: Nov. 19, 1996

[30] Foreign Application Priority Data

Nov. 20, 1995 [JP] Japan ................................. 7-300999

[51] Int. Cl.$^6$ ....................................................... G06F 11/00
[52] U.S. Cl. ...................................................... 395/182.02
[58] Field of Search .............................. 395/181, 182.02, 395/280; 371/20.1; 370/216, 217, 225, 229, 235, 237; 364/281.9, 285

[56] References Cited

U.S. PATENT DOCUMENTS

| 4,747,097 | 5/1988 | Ohya et al. | 370/88 |
| 5,065,399 | 11/1991 | Hasegawa et al. | 371/11.2 |
| 5,167,033 | 11/1992 | Bryant et al. | 395/575 |
| 5,235,599 | 8/1993 | Nishimura et al. | 371/11.2 |
| 5,408,618 | 4/1995 | Aho et al. | 395/325 |
| 5,680,390 | 10/1997 | Robrock, II | 370/229 |

FOREIGN PATENT DOCUMENTS

| 358542 | 3/1991 | Japan | H04L 11/20 |
| 364142 | 3/1991 | Japan | H04L 11/20 |
| 496447 | 3/1992 | Japan | H04L 11/20 |
| 5252160 | 9/1993 | Japan | H04L 11/08 |

OTHER PUBLICATIONS

Grover et al., "Performance of the Self Healing Network Protocol With Random Individual Link Failure Times", IEEE, pp. 660–666, Jun. 1991.

Grover et al., "Performance Studies of a Self Healing Network Protocol In Telecom Canada Long Haul Networks", IEEE, pp. 452–458, Dec. 1990.

Grover et al., "Development and Performance Assessment of a Distributed Asynchronous Protocol For Real–Time Network Restoration", IEEE, pp. 112–125, 1991.

Balakrishnan et al., "Routing Strategies For Fault Recovery in Wide Area Packet Networks", IEEE, pp. 1139–1143, Nov. 8, 1995.

Institute of Electronics, Information and Communication Engineers (IEICE) Technical Report, 1995, vol. 95, No. 391 Abstract Only (In English).

Tipper et al., "An Anaysis of the Congestion Effects of Link Failures in Wide Area Networks", IEEE, pp. 1042–1050, Apr. 1993.

Tipper et al., "An Analysis of the Congestion Effects of Link Failures in Wide Area Networks", IEEE, pp. 179–192, Jan . 1994.

Grover, "The Self–Healing Network–A Fast Distributed Restoration Technique For Networks Using Digital Cross-connect Machines," IEEE, pp. 1090–1094, Nov. 1987.

*Primary Examiner*—Robert W. Beausoliel, Jr.
*Assistant Examiner*—Stephen C. Elmore
*Attorney, Agent, or Firm*—Ostrolenk, Faber, Gerb & Soffen, LLP

[57] ABSTRACT

In a self-healing communications network of meshed topology, wherein a group of network nodes form part of the network and support a communication route, a delay time period is established for each network node of the group in response to the occurrence of a failure in the communication route, the delay time period of each network node of the group being different from the delay time periods of other network nodes of the group. A self-healing fault restoration activity is initiated from each of the network nodes of the group when the amount of time elapsed from the time of occurrence of the failure equals the delay time period established for each network node. As a result, self-healing fault restoration activities are initiated from several network nodes at successively delayed instants, and control traffic is time-dispersed, preventing traffic concentration of fault restoration messages.

8 Claims, 1 Drawing Sheet

SELF-HEALING NETWORK INITIATING FAULT RESTORATION ACTIVITIES FROM NODES AT SUCCESSIVELY DELAYED INSTANTS

BACKGROUND OF THE INVENTION

1. Field of the Invention

The present invention relates generally to self-healing communications networks and more specifically to the avoidance of traffic congestion during a fault restoration process.

2. Description of the Related Art

In conventional self-healing communications networks where a network node broadcasts a fault reservation message to adjacent nodes in response to the occurrence of a failure in a route terminating at the node, control messages are exchanged between nodes to secure a bandwidth for a new route. The network is thus flooded with such messages. One example of such networks is described in U.S. Pat. No. 5,235,599 issued to Yasuyo Nishimura et al and assigned to the same assignee as the present invention. Because of the meshed network topology, some of the propagating messages may converge to node, causing a traffic congestion which could lead to a prolonged restoration process.

SUMMARY OF THE INVENTION

It is therefore an object of the present invention to provide a communications network having a meshed topology in which congestion of fault restoration messages which would otherwise occur during a self-healing fault recovery process is avoided.

According to the present invention, a delay time period is established for each node of a network node group that forms part of a meshed communications network when a failure occurs in a route which is supported by the nodes of that group, the delay time period of each network node of the group being different from the delay time periods of other network nodes of the same group. A fault restoration activity is initiated from each of the network nodes of the group when the amount of time elapsed from the time of occurrence of the failure equals the delay time period established for each network node.

As a result, fault restoration activities are initiated from the network nodes of the group at successively delayed instants, and control traffic is time-dispersed, preventing traffic concentration of fault restoration messages.

BRIEF DESCRIPTION OF THE DRAWINGS

The present invention will be described in further detail with reference to the accompanying drawings, in which.

DETAILED DESCRIPTION

Figure 1:
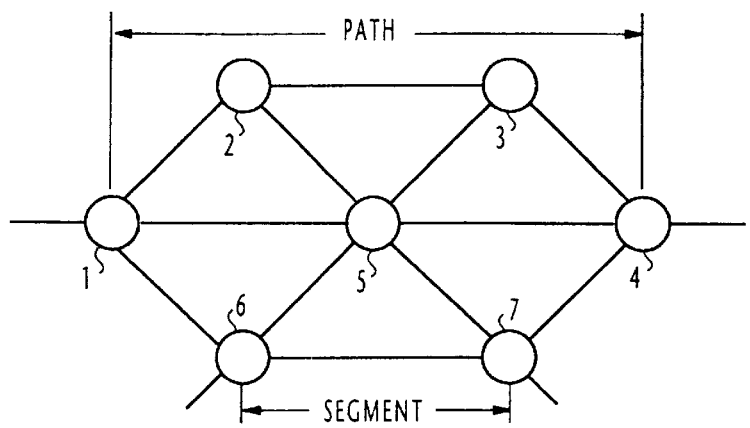
FIG. 1 is a schematic diagram of a communication network of meshed topology according to the present invention.

In FIG. 1, there is shown a communications network according to the invention in which a plurality of nodes 1 through 7 are interconnected by transmission links in a meshed topology. The links between nodes have working and spare channels. A non-switched, direct route between any two adjacent nodes is designated as a "segment" and a switched route between any two nodes (switched via one or more intermediate nodes) is designated as a "path". For example, a path is supported by a group of nodes 1, 2, 3 and 4, and a segment is supported by a group of nodes 6 and 7.

Figure 2:
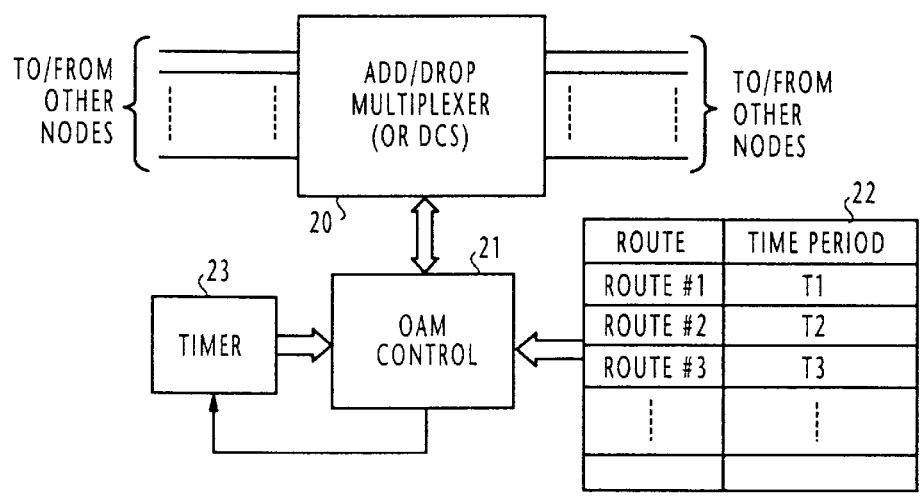
FIG. 2 is a block diagram of a network node if FIG. 1 incorporating the present invention.

As shown in FIG. 2, each of the network nodes comprises an add/drop multiplexer or digital cross-connect system (DCS) 20 to which transmission links are terminated. An OAM (operations, administration and maintenance) controller 21 controls the ADM 20 to establish relatively static connections between the terminating links and reconfigure the connections according to varying traffic needs as well as to fault recovery actions. Paths, path groups, segments, and/or segment groups terminating at a node of the network are assigned delay time periods and the delay time period of each route differs from one node to another. As will be described, a delay time period is established for each node of a network node group that forms part of the network when a failure occurs in a route supported by the nodes of that group. The delay time period of each network node of the group is different from the delay time periods of other network nodes of the same group. The routes terminating at each network node and their assigned delay time periods are mapped in a delay time memory 22 with which the OAM controller 21 of the node is associated. A timer 23 is provided to start incrementing a clock count in response to a start-of-count signal from the controller 21.

Figure 3:
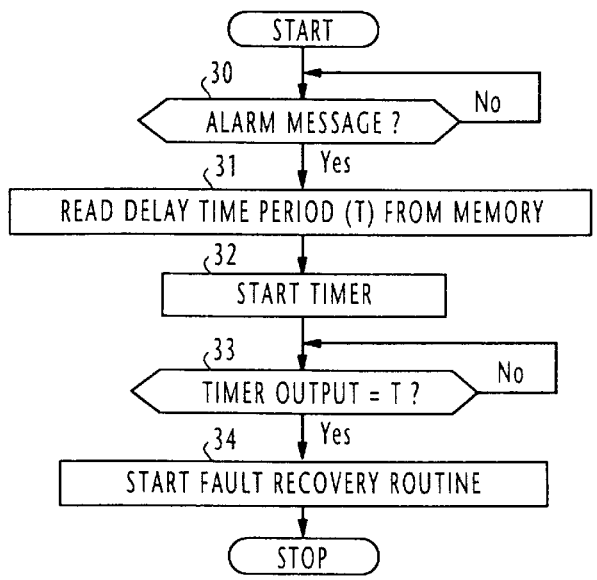
FIG. 3 is a flowchart of the operation of the OAM controller of FIG. 2.

As illustrated in the flowchart of FIG. 3, when a failure occurs in a link terminating a node, the OAM controller 21 of the node produces an alarm message identifying the faulty route or receives an alarm message from an adjacent node (step 30). At step 31, the controller reads a delay time period of the faulty route identified by the alarm message from the memory 22. Flow proceeds to step 32 where the controller 21 activates the timer 23 to start incrementing its clock count and compares the count value with the delay time period of the fault-identified route. When the timer 23 output equals the delay time period, the controller 21 produces an affirmative decision at step 33 and begins a fault recovery action at step 34 by sending a reservation message to the network for acquiring the necessary bandwidth from the working network resource to establish a new route.

Therefore, if a failure occurs in a path, a fault recovery action first begins at a node assigned the minimum of delay times assigned to the nodes that support the failed path, and the other nodes of the path follow suit at successive instants. For example, if there is a path that extends from node 1 to 4 via nodes 2 and 3, the delay time periods assigned to nodes 1, 2, 3 and 4 with respect to that path are unique and different from each other and each node of the group of nodes 1 to 4 begins sending their restoration messages at successive instants of time to adjacent nodes.

The present invention is particularly useful in improving a fault recovery process where each node, on receiving an alarm message, broadcasts a reservation message to adjacent nodes and where the network would normally be flooded with such messages for the reservation of a bandwidth for a new route. Because of the meshed network topology, some of the broadcast messages may concentrate on a node, causing a bottle neck in the flow of network traffic. Such traffic concentration can be effectively avoided by the present invention by causing fault-affected nodes to issue their fault restoration messages at successively delayed instants.

The segments and paths terminating at a node may be given different priorities during a fault recovery so that high-usage routes are restored in preference over other transmission routes. In such instances, the delay time periods of a node differ from one route to another according to their priorities in addition to the aforesaid delay time differences among the network nodes of a group which supports the same path or segment.

Figure 4:
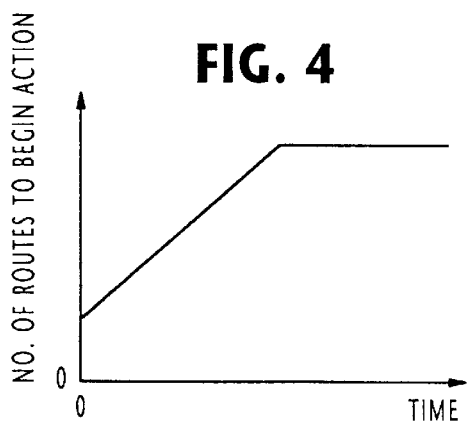
FIG. 4 is a graphic representation of the number of routes to begin fault recovery action plotted as a function of time.

FIG. 4 shows one example of assigning time delays according to fault recovering priorities, where the number of routes to begin the fault recovery action (i.e., sending a reservation or restoration message) is plotted as a function of the amount of time elapsed from the time of occurrence of a fault event. In the illustrated example, the number increases linearly with time and then remains constant. By using the number plotted in FIG. 4, the delay time period of each prioritized route is determined.

While mention has been made of a lookup table for storing delay time data, the present invention allows a modification in which a delay time derivation rule is stored in a memory and recalled in response to an alarm message for deriving a delay time period specific to the faulty path or segment.

What is claimed is:

1. A communications network, comprising:

a plurality of interconnected network nodes forming a meshed topology network, a group of the network nodes defining a communication route; and a plurality of fault recovery circuits, one circuit disposed in each of the network nodes of said group, the fault recovery circuits being operable to detect an occurrence of a failure in said route and to initiate a self-healing fault recovery action only after an delay period from the detection of the failure, the delay period for each network node of said group being different from one another.

2. A communications network as claimed in claim 1, wherein the delay period of a network node with respect to a first route differs from the delay period of a network node with respect to a second route according to priorities of said first and second routes.

3. A communications network as claimed in claim 2, wherein the fault recovery circuit of each network node includes a memory in which a plurality of routes are mapped to a plurality of delay periods, the fault recovery circuit being arranged to (i) read a delay period from the memory corresponding to the route in which said failure has occurred, and (ii) initiate said fault recovering action when said delay period has elapsed from the time of detection of said failure, said delay periods of the network node being different from the delay periods of other network nodes of said group and further different from each other according to priorities of said plurality of routes.

4. A communications network as claimed in claim 1, wherein the fault recovery circuit of each network node includes a memory in which a plurality of routes are mapped to a plurality of delay periods, the fault recovery circuit being arranged to (i) read a delay period from the memory corresponding to the route in which said failure has occurred, and (ii) initiate said fault recovering action when said delay period has elapsed from the time of detection of the failure, each of said delay periods of the network node being different from corresponding delay periods of other network nodes of said group.

5. A method for a communications network of meshed topology formed by a plurality of interconnected network nodes, the method comprising the steps of:

a) establishing, for each network node of a group of network nodes which form part of the network and support a communication route, a delay time period in response to occurrence of a failure in said route, said delay time period of each network node of said group being different from the delay time periods of other network nodes of said group; and b) initiating a self-healing fault recovering action from each of the network nodes of said group when the amount of time elapsed from the time of said occurrence equals the delay time period established for each network node of said group.

6. A method as claimed in claim 5, wherein the delay time period with respect to a first route differs from the delay time period with respect to a second route according to priorities of said first and second routes.

7. A method as claimed in claim 5, wherein the step (b) comprises sending a reservation message to the network from each network node of said group when the amount of said elapsed time equals the delay time period established for each network node of said group for reserving a bandwidth necessary for establishing a new route.

8. A communications network, comprising:

a plurality of interconnected network nodes forming a meshed topology network, a group of the network nodes defining a communication route;

a plurality of fault recovery circuits, one circuit disposed in each of the network nodes of said group, the fault recovery circuits being operable to detect an occurrence of a failure in said route and to initiate a self-healing fault recovery action after an established delay period from the time that the failure occurred; and a plurality of memory units, one memory unit located in each fault recovery circuit and having a plurality of routes mapped to a plurality of delay periods stored therein, the fault recovery circuit being arranged to (i) read a delay period from the memory corresponding to the route in which said failure has occurred, and (ii) initiate said fault recovering action when said delay period has elapsed from the time of detection of the failure, each of said delay periods of the network node being different from corresponding delay periods of other network nodes of said group.

* * * * *